No. 757,968. PATENTED APR. 19, 1904.
M. SCHELL.
FOCUSING DEVICE FOR CAMERAS.
APPLICATION FILED JUNE 19, 1903.
NO MODEL. 2 SHEETS—SHEET 1.
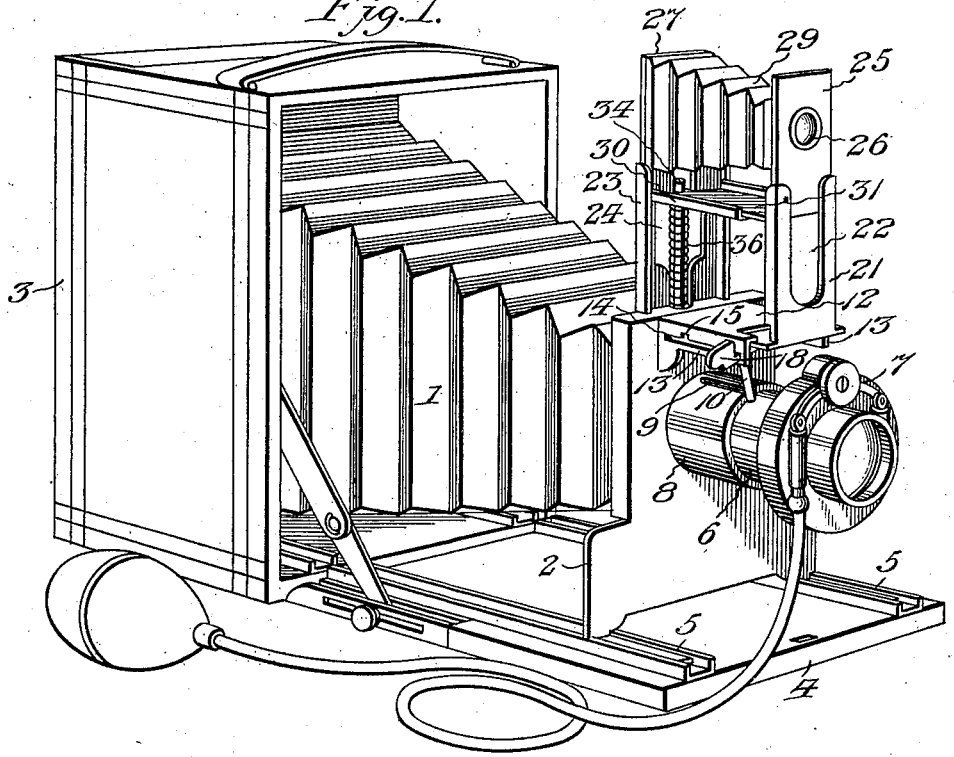
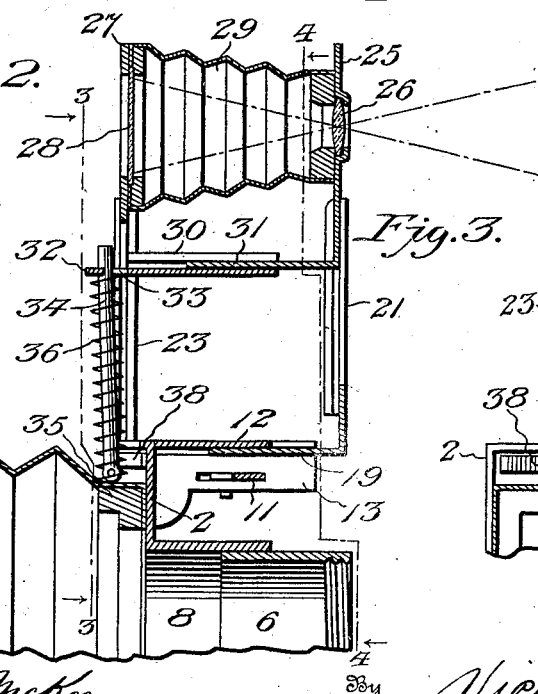
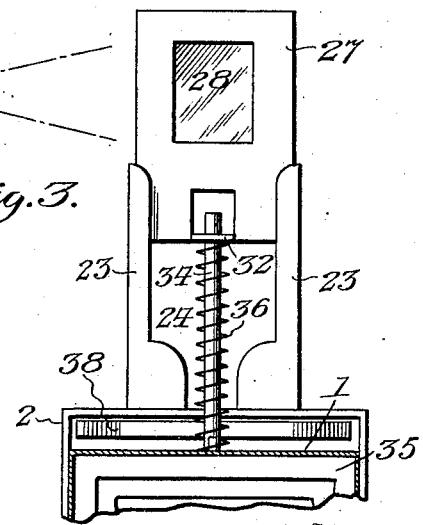
Inventor
Martin Schell
Witnesses
Edwin G. McKee
Chas. S. Hyer.
By Victor J. Evans
Attorney No. 757,968. PATENTED APR. 19, 1904.
M. SCHELL.
FOCUSING DEVICE FOR CAMERAS.
APPLICATION FILED JUNE 19, 1903.
NO MODEL. 2 SHEETS—SHEET 2.
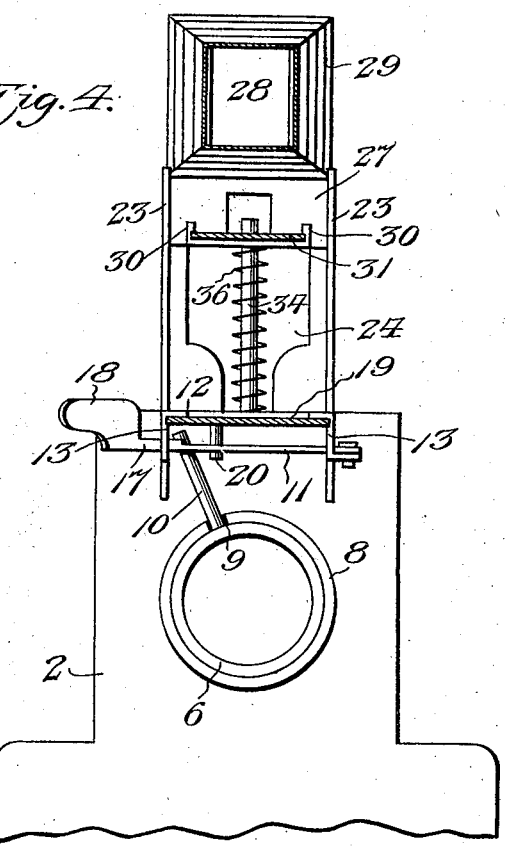
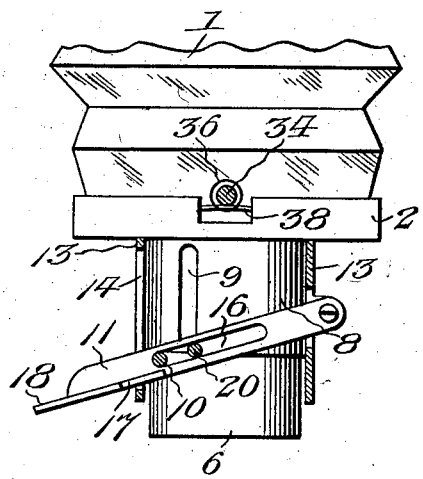
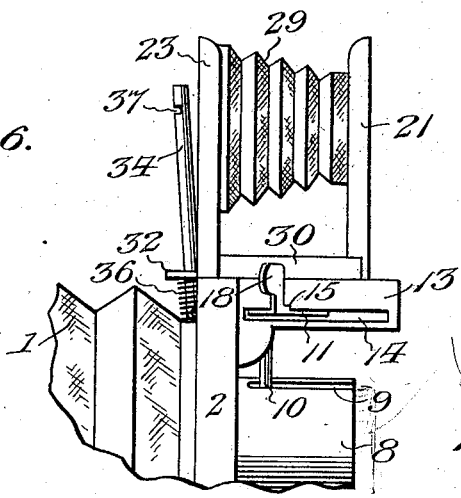
Witnesses
Edwin G. McKee
Chas. S. Hyer
Inventor
Martin Schell
By Victor J. Evans
Attorney No. 757,968.                                              Patented April 19, 1904.

UNITED STATES PATENT OFFICE.

MARTIN SCHELL, OF ROCHESTER, NEW YORK.

FOCUSING DEVICE FOR CAMERAS.

SPECIFICATION forming part of Letters Patent No. 757,968, dated April 19, 1904.

Application filed June 19, 1903. Serial No. 162,295. (No model.)

*To all whom it may concern:*

Be it known that I, MARTIN SCHELL, a citizen of the United States, residing at Rochester, in the county of Monroe and State of New York, have invented new and useful Improvements in Focusing Devices for Cameras, of which the following is a specification.

This invention relates to focusing devices for cameras of the type in which the lens and the finder attachment of a camera are adjustable with the camera-lens in order to obtain a focus upon the glass of the finder and obviate the necessity of employing the usual focusing glass or screen in rear of the camera.

The essential object of the invention is to provide a focusing device of a simple and effective construction adapted to be conveniently and expeditiously operated, arranged to dispose the same within view of the operator or be easily reduced as to its projection for storage in the camera box or casing.

With this and other objects and advantages in view the invention consists in the construction and arrangement of the several parts, which will be more fully hereinafter described and claimed.

In the drawings, Figure 1 is a perspective view of a camera shown open and illustrating the improved focusing attachment applied thereto and in retracted position. Fig. 2 is a longitudinal vertical section through the front of the camera, a portion of the bellows, camera-lens, and the improved focusing attachment, showing the latter elevated in operative position. Fig. 3 is a transverse vertical section on the line 3 3, Fig. 2. Fig. 4 is a transverse vertical section on the line 4 4, Fig. 2. Fig. 5 is a horizontal section through the front portion of the camera above the camera-lens and through the lower part of the focusing attachment. Fig. 6 is a side elevation of the front part of the camera and the focusing attachment, showing the latter reduced to compact form both longitudinally and vertically for storage within the camera box or casing.

Similar numerals of reference are employed to indicate corresponding parts in the several views.

The improved focusing attachment is illustrated as applied to that type of camera in which the bellows 1 and camera-front 2 are contained when collapsed within the case 3, the front side 4 of the case forming the camera-bed. The camera-front 2 is longitudinally slidable in guides 5, secured on opposite portions of the inner surface of the front side 4 and the bottom of the case 3 and movable with the front 2, and secured thereto is a camera lens-tube 6, carrying shutter mechanism 7, the said lens-tube 6 for the purpose of focusing being mounted within an outer tube 8 after the usual manner of organizing camera lens-tubes. The outer tube 8 is formed with a longitudinal slot 9, preferably in the upper portion thereof and slightly to one side of the center, the said slot being adapted to receive and form a guide for an arm or projection 10, made rigid with the lens-tube 6 and projecting upwardly from the latter at a slight inclination, so as to bring its end into proper operative relation to a horizontally-disposed adjusting-lever 11, held by a forwardly-projecting support 12, having depending sides 13. The lever 11 is pivotally attached to one of the sides 13 and movable in a slot 14, extending longitudinally of the opposite side, an upwardly-projecting seat-recess 15 communicating with the said slot 14. The arm or projection 10 extends through a longitudinal slot 16 in the lever 11, and the latter also has an upwardly-projecting lip 17 adjacent to a finger-piece 18 on one terminal, the said lip being adapted to engage the seat-recess 15, sufficient movement of the lever being permitted for this purpose. A slide 19 is held by the top of the support 12, and therefrom depends a pin or projection 20, which loosely engages the slot 16 of the lever 11 at a distance from the arm or projection 10. Both the arm or projection 10 and the pin 20 loosely engage the slot 16, and by moving the lever 11 in opposite directions the camera lens-tube 6 and the slide 19 will be correspondingly and proportionately moved or adjusted, or, in other words, the requisite proportionate movement of the coöperating parts can be secured. The arm or projection 10 during the adjustment of the lens-tube 6, particularly when moving said tube rearwardly, enters the slot 9.

The slide 19 has an upstanding guide 21 at its front end, with a vertical slot 22 therein, and rising from the upper end of the camera-front 2 is a guide 23, also formed with a vertical slot 24, the guides 21 and 23 being practically in alinement. The rear guide 23 is wider than the guide 21 to accommodate the increased proportions of the rear part of the finder coöperating with the said guides. The finder comprises a front plate 25, with a lens 26 and a rear plate 27, with a ground or other opaque glass 28 held therein, the plates being connected by a bellows 29. The plates 25 and 27 are vertically movable, respectively, in the guides 21 and 23, and the slots in the said guides are to permit a close collapse of the parts and avoid injury to projecting portions of the lens 26 and the glass plate 28 and also to permit exposure of said lens and glass plate when the finder is lowered within its guides. Projecting from the lower terminal of the plate 27 is a horizontal guide 30, in which is mounted a slide 31, secured to the lower end of the plate 25, to permit the front portion of the finder to be adjusted longitudinally proportionate to the movement of the slide 19. The horizontal guide 30 has a lip 32 projecting rearwardly therefrom through the slot 24 in the vertical guide-plate 23, and in said lip an opening 33 is formed, through which projects a guide rod or post 34, movably attached at its lower end to the upper part of the front frame 35 of the bellows 1, and surrounding said post is a coil-spring 36, which operates to throw the finder upwardly in the guides 21 and 23 when the lever 11 is released. The post 34 has a slot 37 in the rear portion of the upper extremity thereof to engage the rear wall of the opening 33 in the lip 32 to hold the finder in positive elevated position. The opening 33 is larger than the diameter of the post 34, so as to permit the post to have sufficient swinging movement to clear the lip 32 when it is desired to lower the finder. The post 34 is normally pressed rearwardly by a leaf-spring 38, held in the upper portion of the camera-front 2 and bowed sufficiently to bear at its center against the lower extremity of the post adjacent to the pivotal attachment of the latter, as clearly shown by Figs. 2 and 5.

When the camera is not in use, the finder is depressed in the guides 21 and 23, and the guide 21 is moved rearwardly toward the guide 23 by shifting the lever 11 until the lip or locking-flange 17 springs into the recess or seat 15. When the lever 11 is moved rearwardly, the slides 19 and 31 are correspondingly shifted in a rearward direction and the attachment is reduced to compact form, as shown by Fig. 6. When the camera is open and it is desired to use the same, the front side 4 is let down to horizontal position, as shown by Fig. 1, and the front 2 is moved outwardly thereover. During this time the finder is in compact collapsed condition, and in order to release the same the lever 11 is pressed downwardly to disengage the lip 17 thereof from the recess or seat 15, when the slides 19 and 31 will be proportionately advanced and the spring 36 will immediately throw up the guide 30, engaging the slide 31 and forming a part of the rear plate 27, the plate 25 also moving upwardly in view of its connection to the slide 31. The finder will continue to elevate the under tension of the spring 36 until the slot 37 in the post 34 arrives opposite or in alinement with the rear wall of the opening 33 in the lip 32, when the leaf-spring 38 will cause the said post to be forced rearwardly and institute a locking action between the post and the lip, as clearly shown by Fig. 2. The finder is held at such elevation that it may be readily inspected from the rear of the camera box or casing 3, and after it is positioned for use, as shown by Figs. 1 and 2, the lever 11 will be adjusted to properly focus the camera, the operator observing the glass 28 during such adjustment. It will be seen that the adjustment of the lever 11 will correspondingly adjust the lens-tube 6 and the focal range will be controlled entirely by the inspection of the glass 28.

In the construction of the finder and the parts intimately associated therewith metal will be used, with the exception of the bellows 29, and the front 2, together with the finder elements, will be suitably ornamented by plating or polishing.

The focusing means, including the finder set forth, will be found exceptionally convenient in use with cameras, and changes in the proportions, dimensions, and minor details may be adopted to accommodate different applications without departing from the spirit of the invention.

Having thus fully described the invention, what is claimed as new is—

1. In an attachment for a camera of the class set forth, the combination of an adjustable lens-tube having a projection, a vertically-movable finder having a longitudinal adjustment, and means for simultaneously and proportionately moving the said lens-tube and the finder in a longitudinal direction.

2. In an attachment for a camera of the class set forth, the combination of an adjustable lens-tube, a vertically-movable finder, and means for simultaneously moving the finder and lens-tube in a longitudinal direction and for locking the parts against movement.

3. In an attachment for a camera of the class set forth, the combination of an adjustable lens-tube, a finder having means in connection therewith to elevate the same for inspection above the top of the camera-box, and means in engagement with the lens-tube and finder for simultaneously moving said parts longitudinally.

4. In an attachment for a camera of the class set forth, the combination of an adjustable lens-tube, a finder having an automatic vertical movement and a longitudinal adjustment, and means for engaging a part of the finder and lens-tube for simultaneously moving the same longitudinally proportionate distances.

5. In an attachment for a camera of the class set forth, the combination of an adjustable lens-tube, a vertically-movable finder having an adjustable lens, means for locking the finder in elevated position, and means engaging the parts of the finder and lens-tube for proportionately moving the latter in a longitudinal direction.

6. In an attachment for a camera of the class set forth, the combination with a camera-front having a lens-tube adjustably carried thereby, of a vertically-movable finder mounted on said front, and means for adjusting the finder-lens simultaneously with the camera-lens.

7. In an attachment for a camera of the class set forth, the combination with a movable camera-front carrying an adjustable lens-tube, of a finder mounted on the said front and having an adjustable lens, and means for adjusting the finder-lens simultaneously with the camera-lens and for locking the finder in collapsed condition.

8. A camera having a vertically-movable and longitudinally-adjustable finder, and means for automatically locking the finder in elevated position.

9. A camera having an adjustable front, a longitudinally-adjustable finder carried by said front, means for automatically elevating the finder, and means for automatically locking the finder in elevated position.

In testimony whereof I affix my signature in presence of two witnesses.

MARTIN SCHELL.

Witnesses:
JOSEPH MÜLLER,
GEORGE RIEFLIN.